United States Patent [19]

Mayhew

[11] Patent Number: 4,798,365
[45] Date of Patent: Jan. 17, 1989

[54] THROTTLING GASKET INSERT FOR USE WITH KNIFE GATE VALVE

[75] Inventor: John Mayhew, Salem, Va.

[73] Assignee: Alphabet, Inc., Warren, Ohio

[21] Appl. No.: 52,106

[22] Filed: May 20, 1987

[51] Int. Cl.⁴ .............................. F16K 3/32; F16K 3/02
[52] U.S. Cl. ................................. 251/205; 251/326; 251/328; 137/375
[58] Field of Search .................. 251/326, 205, 328; 137/375, 369, 364

[56] References Cited

U.S. PATENT DOCUMENTS

| | | | |
|---|---|---|---|
| 2,002,965 | 5/1935 | Smith | 137/75 |
| 2,883,148 | 4/1959 | Williams | 251/205 |
| 3,105,620 | 10/1963 | Atkins et al. | 222/342 |
| 3,542,338 | 11/1970 | Scaramucci | 251/209 |
| 3,548,864 | 12/1970 | Handley et al. | 137/364 |
| 4,009,727 | 3/1977 | Bailey | 251/326 X |
| 4,377,274 | 3/1983 | Mayhew | 251/327 |
| 4,646,407 | 3/1987 | Mayhew | 29/157.1 |

FOREIGN PATENT DOCUMENTS 2507839 9/1976 Fed. Rep. of Germany ...... 251/205

OTHER PUBLICATIONS

Bulletin 30.00-1 of Jun., 1981—DeZurik Series L Knife Gate Valves.
Rovalve Figure 20—Bonnetless Knife Gate Valve Fabri-Valve Cat. 600—Seating Options.

Primary Examiner—Arnold Rosenthal
Attorney, Agent, or Firm—Griffin, Branigan & Butler

[57] ABSTRACT

A throttling gasket insert (34) for attaching a knife gate valve (10) into a pipe string is constructed of a single piece of resilient gasket material having a washer-shaped flange portion (36), to be clamped between a facing surface (52) of a knifegate-valve face plate (26) and a pipe flange (60), and a tubular portion (42), extending through a knife-gate valve flow passage (22) to a knife-gate blade (12) thereof, having a V-shaped passage therethrough.

3 Claims, 1 Drawing Sheet

THROTTLING GASKET INSERT FOR USE WITH KNIFE GATE VALVE

BACKGROUND OF THE INVENTION

This invention relates broadly to the art of knife gate valves and more particularly to gaskets for attaching knife gate valves to pipes and also to devices which allow fine regulation of flow through knife gate valves.

Knife gate valves have long been preferred for controlling the flow of certain materials and also under certain environmental conditions. For example, knife gate valves are often used in slurry-pipe systems. In this respect, knife gate valves have the advantage of quickly providing large openings through pipe strings while not being especially sensitive to jams and malfunctions caused by larger particles in a flow. Also, knife gate valves require very little axial, face plate to face plate, space along a pipe string. It is known, however, that under normal circumstances knife gate valves have the disadvantage that one can usually not finely regulate the flow of material therethrough. In this regard when a knife-gate blade is lifted only slightly its broad tip rises from a seat allowing a great deal of flow therethrough. A number of devices have been suggested for converting a knife gate valve into a throttling (finely controlled) knife gate valve which allows finer control of flow therethrough. In this respect, most of these systems concern the attachment of plates to a knife-gate-valve seat or frame, to create a V-shaped baffle in the flow passage next to the knife-gate blade. As the blade of such a modified valve is lifted, the tip of the V-opening is first uncovered, rather than providing a wide crescent-shaped opening as with most knife gate valves, thereby providing a small flow. As the gate is further lifted, the sloping sides of the V-opening are uncovered to slowly increase flow. One such system is described in U.S. Pat. No. 2,883,148 to Williams, however, there are many other such systems in the prior art. Many of these systems involve the welding of plates in knife-gate flow passages, however, Williams employs a metal insert which is inserted from outside a valve frame into its flow passage to form a V-shaped opening at the knife gate blade and to have a flange which covers a face plate of the knife gate valve. The insert flange is then clamped between a pipe flange and the knife-gate valve face plate to form a sealing connection therewith. Further, the inner end of Williams' insert must make contact with a resilient seat member to prevent the flow of slurry about the insert which would otherwise allow accumulation of solids thereabout. A locating pin extending from the flange of the insert fits into a hole in the knife gate valve face plate to properly orient the insert. Although Williams' insert offers simplicity and flexibility over systems involving welding, it is not generally used because it has a number of significant disadvantages. One disadvantage of Williams' insert is that it can only be used with certain knife gate valves, and most likely would require a specially made knife gate valve. The reason for this is that this insert must make sealing contact with a resilient seat member positioned at the knife-gate blade. If a knife gate valve does not have this resilient seat member, fluid controlled with the knife gate valve will flow about the insert thereby causing the accumulation of solids, jamming the valve after significant use. Further, Williams' insert relies on the use of a finely machined pipe flange, a finely machined insert flange (on both sides), and a finely machined valve face plate to obtain a proper metal-to-metal seal. Such machining of metal is labor intensive and extremely expensive. Yet another problem with Williams' insert is that it has a fixed, unadjustable, dimension from its the V-shaped opening to its flange. Unfortunately, this distance is not the same for all valves and even if it were tolerances would vary between valves of the same make. These different dimensions and tolerances do not always allow the flange and V-shaped opening of Williams' insert to form a good seal with a face plate and simultaneously make sliding engagement with a valve blade. Similarly, it is not possible to adjust Williams' insert at work locations because his V-forming baffle and his insert flange cannot be moved relative to one another.

It is an object of this invention to provide a one-piece throttling insert which serves as a resilient gasket between a knife gate valve face plate and a pipe flange and which also provides its own gasket to form an axial seal with the knife gate valve flow passage and sliding engagement with a knife gate valve blade. Further, it is an object of this invention to provide such an insert which does not have to be unduly machined to provide a metal-to-metal sealing surfaces but which allows adjustment at an inner V-shaped passage forming end seat to accommodate various distances between face plates of knife gate valves and the blades thereof. Further, it is an object of this invention to provide such a throttling insert which is inexpensive to manufacture, easy to use, but which is extremely effective in use for metering fluid flow through a knife gate valve without allowing undue jamming thereof.

SUMMARY

According to principles of this invention, a knife-gate-valve throttling insert is constructed of a single piece of resilient gasket material to have a washer-shaped flange portion to be clamped between a face plate of a knife gate valve and a pipe flange and a tubular portion, formed as one piece with the circular flange portion, for extending into a flow passage of the knife gate valve and forming an inner end seat for making sliding engagement with a knife gate blade. The tubular portion has a V-shaped passage extending from an inner-end seat thereof through the washer-shaped flange. The throttling insert is sized and shaped so that the washer-shaped flange portion makes sealing contact with the face plate of the knife gate valve while the outer circumference of the tubular portion fits snugly in the valve flow passage and the inner end seat is positioned adjacent the knife-gate blade. However, if these dimensions are not correct to fit a particular valve, either the insert, which is of a resilient gasket material, can be forced into position or its size can be easily cut down to make it the proper size.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
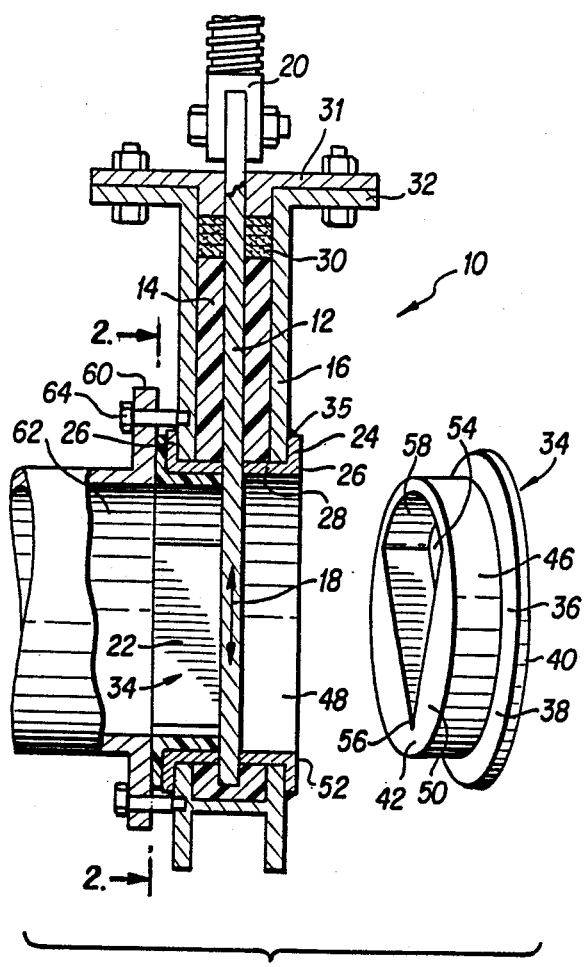
FIG. 1 is an edge sectional view taken on line 1—1 in FIG. 2, with an insert of this invention shown exploded therefrom in isometric form.

Referring now to the drawings, a knife gate valve 10 basically comprises a gate blade 12, a liner 14, and a frame 16. In overall operation, the gate blade 12 is moved upwardly and downwardly in the direction shown by arrows 18 by a driving screw 20 to respectively cover and uncover a flow passage 22 through both the frame 16 and the liner 14. Annularly-shaped shields 24, having L-shaped cross sections, are welded to the frame 16 at opposite mouths to the flow passage 22 to form face plates 26 and tubular passage plates 28. The frame 16 is constructed of forged steel or cast iron while the shields 24 are constructed of stainless steel. The shields 24 are welded to the frame 16 at 35. Waxed packing 30 is installed above the liner 40 between frame side plates and the gate blade 12 and this packing is held in position by a packing follower 31 which is bolted to a flange 32 of the frame 16. The packing 30 prevents flow of fluid around the blade 12.

Figure 2:
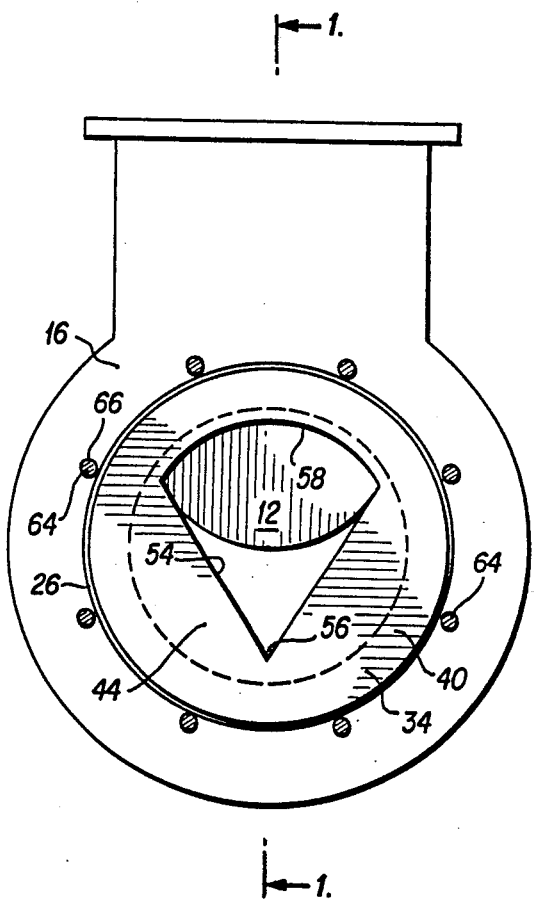
FIG. 2 is a side view of the knife gate valve of FIG. 1 of this invention taken 90° from the FIG. 1 view with some unimportant parts being left out for purposes of simplicity; and, FIG. 3 is a side view of an insert of this invention showing the opposite side of the insert from that seen in FIG. 2.
Figure 3:
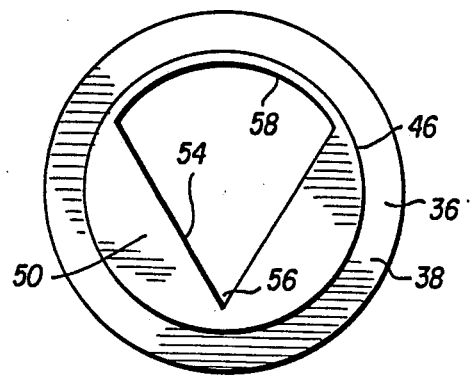

Looking now at a throttling insert 34 of this invention, this insert is constructed of one piece of resilient gasket material. A material which works particularly well is a polyethylene thermal plastic having a molecular weight of 2 to 6 million. A particular product which works well for the throttling insert 34 is a high-density polyethylene sold under the trademark 1900 UHMW POLYMER by Hercules, Inc. of Wilmington, Del. The throttling insert 34 is normally constructed of a thick piece of resilient gasket material which is cut to have the shape shown in the drawings, however, it could also be molded to have this shape. In this respect, the throttling insert 34 includes a washer-shaped flange portion 36 which is thin and which has flat surfaces on inner and outer sides 38 and 40 thereof. The throttling insert 34 also includes a tubular portion 42 which is formed as one piece with the circular washer-shaped flange portion 36. In this respect, an outer end surface 44 of the tubular portion 42 is coplanar with the outer side 40 of the flange portion 36 to form a single surface therewith as can be seen in FIG. 2. The tubular portion 42 has a cylindrically-shaped circumferential outer surface 46 which has substantially the same dimension as an inner surface 48 of the passage plates 28 so that the tubular portion 42 fits snugly in the passage plates 28. The length of the circumferential surface 46 in the axial direction from the inner side 38 of the flange portion 36 to an inner end seat portion 50 of the tubular portion 42 is approximately the same distance as the distance from a facing surface 52 of the face plate 26 to the gate blade 12 when the gate blade is in a closed position. For most knife gate valves this length will be more than three times the thickness of the flange portion 36.

A V-shaped passage 54 having a V-apex 56 on one side and an arcuate surface 58 on the other side extends through the tubular portion from the inner end seat portion 50 to the outer end surface 44. In the preferred embodiment, this V-shaped passage retains basically the same cross sectional shape and size throughout its entire axial length.

It will be appreciated that when the tubular portion 42 of the throttling insert 34 is inserted into the flow passage 22 the circumferential surface 46 thereof makes snug contact with the inner surface 48 of the passage plate 28. When the insert is pushed home so that the inner side 38 of the flange portion 36 makes contact with the facing surface 52, the inner end seat portion 50 is extremely close to, or makes light, sliding, contact with, the gate blade 12. Such a throttling insert 34 is shown mounted in a knife gate valve 10 on the left side thereof in FIG. 1.

In operation, tubular portions 42 of two such throttling inserts are inserted into the flow passage of a knife gate valve 10 from opposite sides thereof with the V-apex 56 of the V-shaped passage 54 for each insert being aligned with that of the other and being oriented toward the bottom of the knife gate valve. Thereafter, flanges 60 of pipes 62 are pressed against the outer sides 40 of the insert flange portions 46 and these pipes are bolted to the frame 16 by means of bolts 64 engaging bolt holes 66 in the frame 16. When the bolts 64 are tightened, the flange portions 36 of the inserts 34 are squeezed between the valve facing surfaces 52 and the pipe flanges 60 to form a liquid tight seal therebetween. In addition, a semi-seal is formed between the circumferential surfaces 46 of the tubular portions 42 of the inserts 34 and the inner surfaces 48 of the passage plates 28 to prevent the flow of eddy currents between these members and thereby prevent wearing of the inserts 34 and the passage plates 28 as well as to prevent the caking of solids in these areas which might cause a jam. In addition, the seat portion 50 of the inserts touch lightly the gate blade 12 so that there is very little space between these members in which liquid can flow which would create wearing of the respective members.

If the throttling insert is slightly too large to properly fit in a knife gate valve as just described, because the insert 34 is resilient it is possible to force it into place if the difference is not great. On the other hand, if the insert is much too big, it is also possible to place it on a lathe to either cut away its circumferential surface 46 or its inner-end seat portion 50 to thereby make the insert fit properly. It should be noted that since the V-shaped passage 54 runs the entire length of the tubular portion 42 cutting away the seat portion 50 does not change the size or shape of the seat portion 50 presented to the blade 12.

It will be understood by those of ordinary skill in the art that the throttling insert 34 of this invention can be made with rather loose tolerances because its resilience allows it to be forced into position if dimension differences are not too great. Also, it is possible to modify the size of the throttling insert 34 at an installation or work site without changing its overall operational features. Further, it will be appreciated that the throttling insert 34 not only allows a knife gate valve to be used for throttling, but also provides a resilient gasket between a pipe flange and a facing surface of the knife gate valve. This insert automatically fills all of the space between a knife gate blade and a pipe attached to the knife gate valve so that it does not allow undesirable fluid flow which creates wear or causes accumulation of solids in undesirable areas.

While the invention has been particularly shown and described with reference to a preferred embodiment, it will be understood by those skilled in the art that various changes in form and detail may be made therein without departing from the spirit and scope of the invention. For example, it would be possible to use an insert only on the downstream side of a knife gate blade if one knows the direction in which fluid will always flow. Further, it would be possible to use the throttling insert 34 with knife gate valve face plates made of a resinous material rather than stainless steel, such as those shown in U.S. Pat. No. 4,646,407 to Mayhew.

The embodiments of the invention in which an exclusive property or privilege are claimed are defined as follows:

1. A throttling gasket insert to be used for converting any one knife gate valve of a plurality of knife gate valves of different sizes and tolerances into a throttling configuration in which it can be used for more finely controlling flows of fluids through a flow passage, said throttling gasket inserts being used to sealingly attach said any one knife gate valve to a pipe string, said plurality of knife gate valves being of a type comprising a gate blade being longitudinally movable in a frame to open and close a lateral flow passage through the frame, said knife-gate valves each defining an annularly-shaped facing surface on an outer surface of the frame surrounding the passage for making sealing contact with pipe flange and a flow-passage bore extending into said mouth of said flow passage, said bore having a standard fixed diameter, said throttling gasket insert comprising a single piece of resilient polymer plastic gasket material of a type to be clamped between flanges of two flow members for forming a seal therebetween, said throttling gasket insert comprising:

a washer-shaped flange portion of a size for being placed between said facing surface surrounding said flow passage and a pipe flange of a pipe to be attached to said knife gate valve at said facing surface, said washer-shaped flange having a generally circular outer perimeter;

a tubular portion being formed as one piece with said flange portion and protruding outwardly from one side of said flange portion said tubular portion having a generally circular-in-cross-section outer surface which is coaxial with, but substantially smaller than the generally circular outer perimeter of said circular washer-shaped flange, said outer surface being of a size and shape for snugly extending into said flow passage, said tubular portion having a flat inner-end throttling seat facing away from said flange portion for being immediately adjacent a knife gate blade when it is in a closed position, said tubular portion having an axial passage therethrough which is V-shaped in cross section, said V-shaped passage extending from said inner end throttling seat over at least substantially half the complete axial length of said tubular portion;

whereby said tubular portion of said throttling gasket insert can be inserted into the lateral flow passage, with said flange portion being seated against the facing surface thereof and said inner-end throttling seat being immediately adjacent said longitudinally-movable gate blade, said throttling gasket insert being formed of one piece of material so that its inner-end throttling seat can be cut away to shorten the length of said tubular portion and a circumferential surface of said tubular portion can be cut away to shorten the length of said tubular portion and a circumferential surface of said tubular portion can be cut away so that it will fit into a smaller flow passage without changing the characteristics of said v-shaped passage therethrough thereby adapting said throttling gasket to sealingly attach to any one of said plurality of different size knife-gate valves having lateral flow passages therethrough, into pipe strings to allow said knife gate valves to be used in said pipe strings as V-shaped passage throttling valves.

2. A throttling gasket insert as in claim 1, wherein said V-shaped passage extends substantially the complete length of said tubular portion.

3. A knife gate valve assembly including a throttling gasket insert to be used for converting any one knife gate valve of a plurality of knife gate valves of different sizes and tolerances into a throttling configuration in which said any one knife gate valve can be used for more finely controlling flows of fluids therethrough, said throttling gasket inserts being used to sealingly attach said any one knife gate valve to a pipe string, said plurality of knife gate valves each being of a basic type comprising a gate blade being longitudinally movable in a frame to open and close a lateral flow passage through the frame, said knife-gate valves each defining an annularly-shaped facing surface on an outer surface of the frame surrounding the passage for making sealing contact with a pipe flange and a flow-passage bore extending into said mouth of said flow passage, said bore having a standard fixed diameter, said throttling gasket insert comprising a single piece of resilient polymer plastic gasket material of a type to be clamped between flanges of two flow members for forming a seal therebetween, said knife gate valve assembly comprising:

a basic type knife gate valve;
a throttling gasket comprising:
a washer-shaped flange portion of a size for being placed between said facing surface surrounding said flow passage of said basic type knife gate valve and a pipe flange of a pipe to be attached to said knife gate valve at said facing surface said washer-shaped flange having a generally circular outer perimeter;

a tubular portion being formed as one piece with said flange portion and protruding outwardly from one side of said flange portion said tubular portion having a generally circular-in-cross-section outer surface which is coaxial with, but substantially smaller than the generally-circular outer perimeter of said circular washer-shaped flange, said outer surface being of a size and shape for snugly extending into said flow-passage of said basic type knife gate valve, said tubular portion having a flat inner-end throttling seat facing away from said flange portion for being immediately adjacent said knife gate blade when it is in a closed position, said tubular portion having an axial passage therethrough which is V-shaped in cross section, said v-shaped passage extending from said inner end throttling seat over at least substantially half the complete axial length of said tubular portion;

whereby said tubular portion of said throttling gasket insert can be inserted into the lateral flow passage, with said flange portion being seated against the facing surface thereof and said inner-end throttling seat being immediately adjacent said longitudinally-movable gate blade, said throttling gasket insert being formed of one piece of material so that its inner-end throttling seat can be cut away to shorten the length of said tubular portion and a circumferential surface of said tubular portion can be cut away so that it will fit into a smaller flow passage without changing the characteristics of said V-shaped passage therethrough thereby adapting said throttling gasket to sealingly attach to any one of said plurality of different size knife-gate valves having lateral flow passages therethrough, into pipe strings to allow said knife gate valves to be used in said pipe strings as V-shaped passage throttling valves.

* * * * *